United States Patent [19]

Frobose

[11] Patent Number: 4,731,900

[45] Date of Patent: Mar. 22, 1988

[54] TUBULAR CHAIR LEG FORMED FOR DIRECT MOUNTING OF CASTER OR GLIDE

[75] Inventor: James W. Frobose, Haskins, Ohio

[73] Assignee: Ajusto Equipment Limited Partnership, Bowling Green, Ohio

[21] Appl. No.: 857,099

[22] Filed: Apr. 29, 1986

[51] Int. Cl.⁴ .......................................... B60B 33/00
[52] U.S. Cl. .......................................... 16/38; 16/43
[58] Field of Search ............... 16/38, 39, 31 R, 43, 16/37, 41 T, 93; 403/109, 104, 80, 361, 230; 29/405, 161, 425, 508, 511, 515, 517

[56] References Cited

U.S. PATENT DOCUMENTS

| | | | |
|---|---|---|---|
| 2,130,245 | 9/1938 | Noelting | 16/43 |
| 2,254,651 | 9/1941 | Herold | 16/43 |
| 2,686,359 | 8/1954 | Spencer | 29/517 |
| 2,732,157 | 1/1956 | Hamilton | 16/43 |
| 3,006,675 | 10/1961 | Swick | 16/38 |
| 3,173,168 | 3/1965 | Nordmark | 16/38 |
| 4,180,346 | 12/1979 | Blake | 403/109 |

FOREIGN PATENT DOCUMENTS

| | | | |
|---|---|---|---|
| 2001133 | 7/1971 | Fed. Rep. of Germany | 16/38 |
| 372136 | 5/1932 | United Kingdom | 16/38 |

Primary Examiner—Nicholas P. Godici
Assistant Examiner—G. M. Reid
Attorney, Agent, or Firm—Brady, O'Boyle & Gates

[57] ABSTRACT

A tubular metal chair leg is formed by a die to provide on its end an integral socket for the direct reception of the pintle of a caster or shank of a glide. The construction enables the use of identical casters and glides on tubular as well as cast legs. The necessity for stocking two sizes of glides for tubular and cast legs plus inserts for casters for tubular legs is eliminated.

7 Claims, 8 Drawing Figures

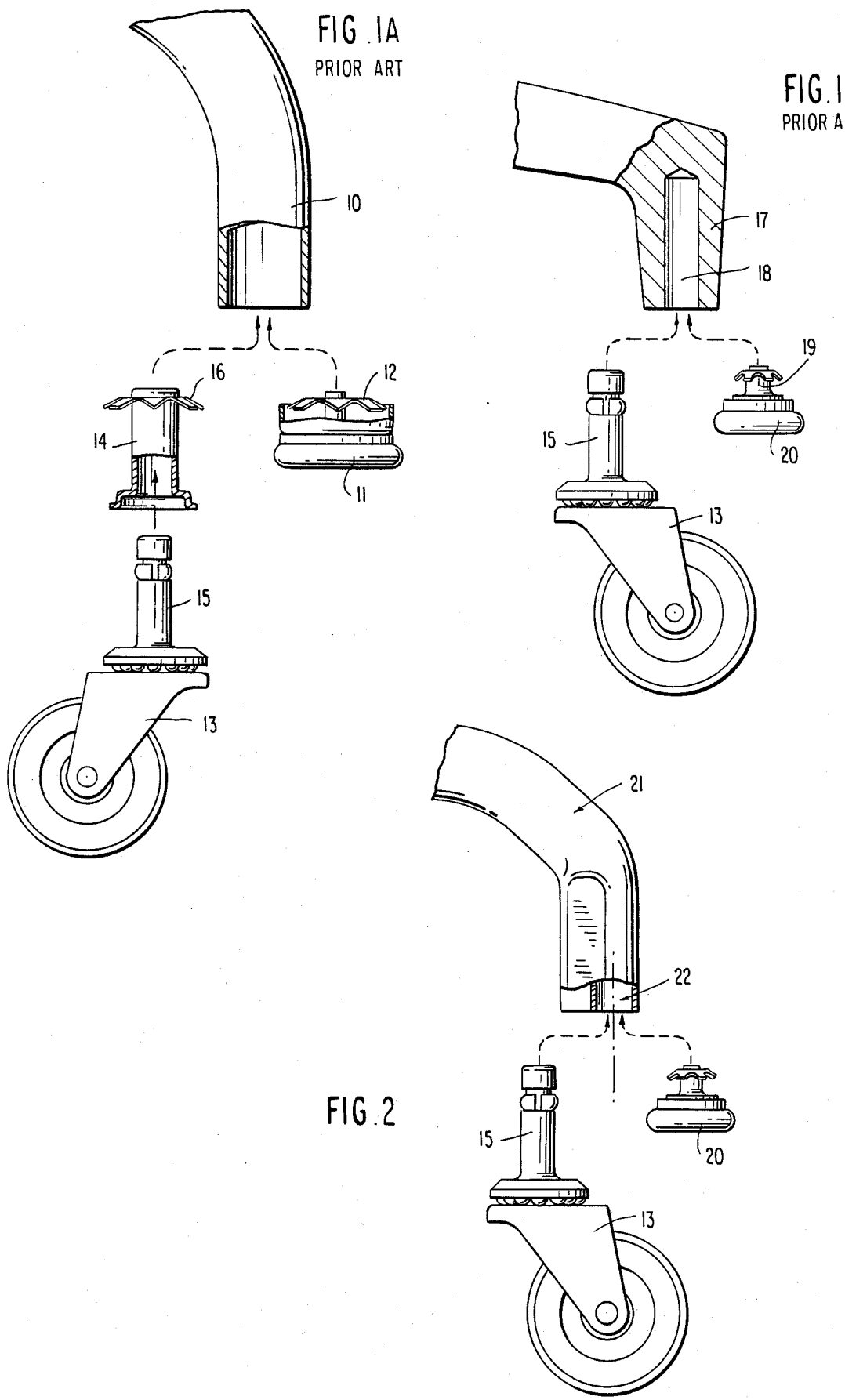

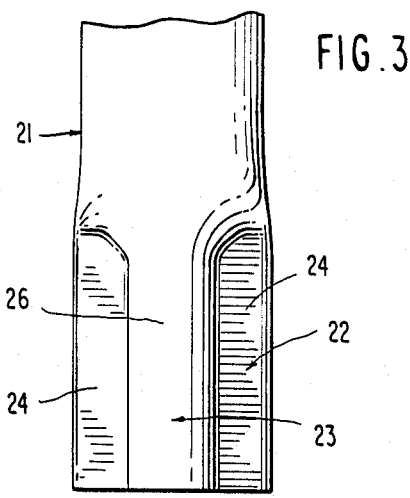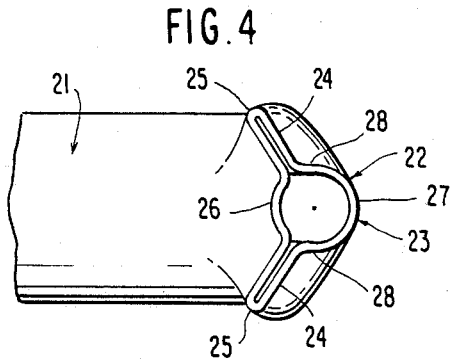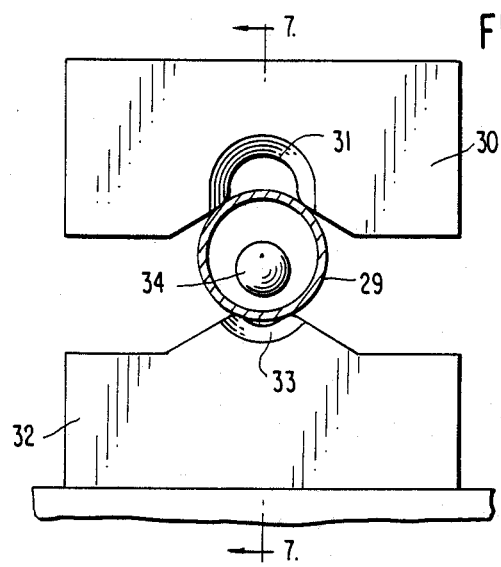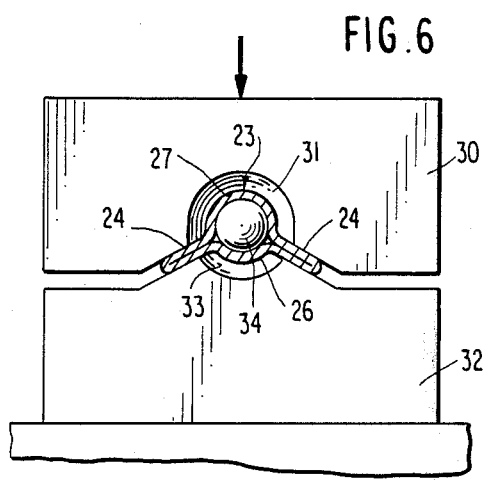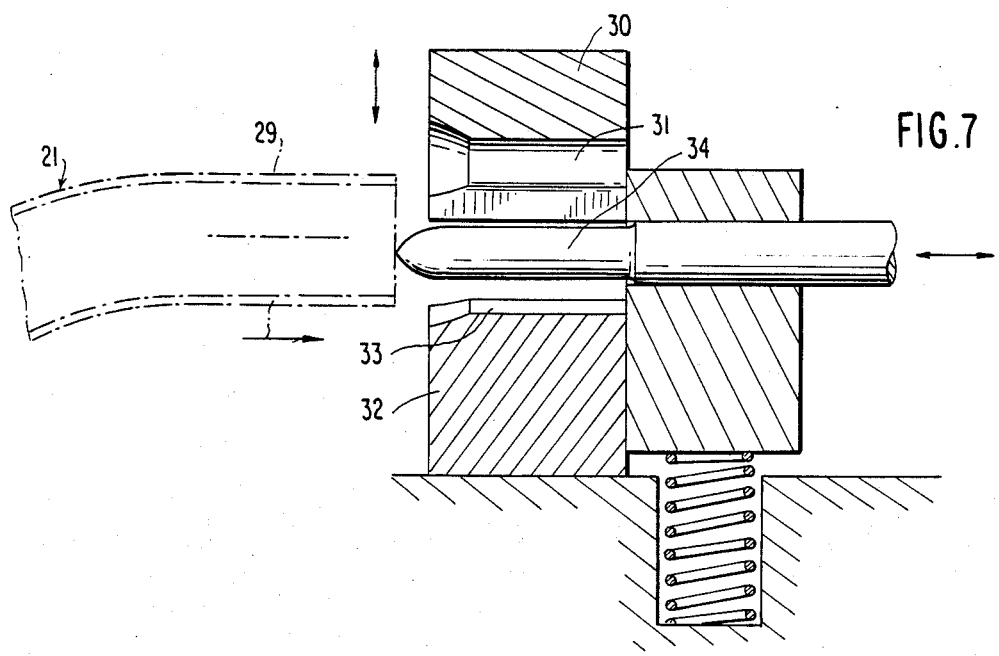

TUBULAR CHAIR LEG FORMED FOR DIRECT MOUNTING OF CASTER OR GLIDE

BACKGROUND OF THE INVENTION

1. Technical Field

The present invention relates to chair legs and their constructions to enable the mounting of casters and glides thereon. More particularly, the invention comprises a formed tubular leg having an integral socket at its lower end enabling the direct mounting of a caster or a glide without the necessity for an intervening caster insert.

2. Description of the Prior Art

Prior U.S. Pat. Nos. 2,130,245; 2,254,651 and 2,732,157 show chair legs equipped with separately formed socket structures for casters which require attaching to the leg by riveting, welding or by driving the socket onto the leg as in U.S. Pat. No. 2,130,245. These patented arrangements are costly and inconvenient and do not deal with a problem existing in the prior art which remains unsolved.

Chairs including industrial and office chairs and other articles of furniture are marketed with metal tubular legs and cast legs as need and buyer demand dictates. The cast legs are drilled in their lower ends to provide a bore to receive the pintle of a caster or the shank of a glide. The tubular legs are constructed of metal tubing stock having an inside diameter substantially larger than the bore of a cast leg, and therefore a larger diameter glide must be provided for placement on the tubular leg, and an insert must be installed in the tubular leg to form a socket for the pintle of a standard caster. Consequently, the chair manufacturer or distributor must stock two sizes of glides for the two types of legs, a caster insert for the tubular leg, plus casters. Heretofore, no economical solution to the problem of reducing this costly inventory of chair hardware has been offered, and it is the main object of the present invention to provide a simple and economical solution to the problem whereby the same caster and glide can be used on either a tubular chair leg or a cast leg having a drilled bore. As a consequence, the necessity for stocking a larger glide and a caster pintle insert for tubular legs is entirely eliminated, and the costly hardware inventory problem is substantially reduced.

SUMMARY OF THE INVENTION

The present invention can be summarized as a die formed integral socket structure for metal tubular chair legs enabling the direct mounting thereon of casters or glides which are identical to those which are mountable on cast chair legs, thus eliminating the need for different sizes of glides and for socket spindle inserts. The die forming of the integral tubular chair leg socket forms a pair of external webs on the lower end portion of the leg which radiate from the integral socket formation at an obtuse angle, thereby avoiding enlarging the lower end portion of the leg significantly beyond the outside diameter of the tubular leg, and also tending to avoid interference of the webs with the feet of an occupant of the chair.

As used in this application, the term "chair leg" is intended to cover the legs of chairs, stools and other seats of all types, as well as diverse furniture articles having legs which may require casters or glides.

BRIEF DESCRIPTION OF THE DRAWINGS

FIG. 1A is an exploded side elevation, partly in section, of a prior art tubular leg, and a caster, caster insert and glide normally required for the tubular leg.

FIG. 1B is a similar view of a cast leg and a caster and glide normally required for such a leg in the prior art.

FIG. 2 is a similar view of a formed tubular leg having an integral socket portion according to the invention and a caster and glide directly engageable in the socket extension selectively.

FIG. 3 is a fragmentary side elevation of the die formed tubular leg with integral socket according to the present invention.

FIG. 4 is a bottom end elevation of the leg in FIG. 3.

FIG. 5 is a partly schematic view of a die set for forming the integral socket on the tubular leg prior to closing the die set.

FIG. 6 is a similar view of the closed die set showing the formation of the integral socket.

FIG. 7 is a central vertical section taken on line 7—7 of FIG. 5.

DETAILED DESCRIPTION

Referring to the drawings in detail wherein like numerals designate like parts, a prior art tubular chair leg 10 in FIG. 1A requires a glide 11 having a retainer washer 12, a caster 13 and a socket insert 14 for the caster pintle 15 having a retainer washer 16.

A prior art cast chair leg 17 in FIG. 1B has a drilled bore 18 which can receive the stem 19 of a smaller glide 20 or the pintle 15 of caster 13.

It may be seen that in the prior art, the chair supplier must stock casters, glides in two sizes and a caster insert for tubular leg chairs or other furniture.

FIG. 2 shows a tubular leg 21 according to the present invention having an integral lower end socket construction 22 formed by die apparatus, to be described. As shown in FIG. 2, the same glide 20 and caster 13 usable with the cast chair leg may be installed selectively on the leg 21, according to this invention. Therefore, the necessity for stocking the larger glide 11 and caster insert 14 is eliminated and a significant problem in the art is completely solved by the invention.

Referring to FIGS. 3 through 7, the integral socket structure 22 for the metal tubular leg 21 is produced on the lower end of the leg by the die set shown in FIGS. 5 to 7. The integral socket structure 22 includes an approximately cylindrical tubular sleeve portion 23 having opposite side radial flat webs 24 defining between them an obtuse angle. The double thickness webs 24 diverge rearwardly and the space between their tips 25 exceeds only slightly the normal diameter of the leg tubing. This enhances the appearance of the chair legs and minimizes interference of the webs 24 with the feet of a chair occupant.

The sleeve portion 23 of the integral socket structure includes a rear relatively shallow arcuate side wall 26 and a forward deeper side wall 27 having flat terminals 28 adjacent to the webs 24. The walls 26 and 27 and their portions 28 are integral with the webs 24, FIG. 4.

FIG. 5 shows the initially cylindrical end portion 29 of the tubular leg 21 placed between a die block 30 having a forming cavity 31 for the front wall 27 and an anvil 32 having a cavity 33 for the rear wall 26 of socket structure 23. A rigid pin 34 of the die apparatus enters the cylindrical tubular end portion 29 of the leg 21.

In FIG. 6, the die block 30 descends toward the stationary anvil 32 and simultaneously produces the divergent radial webs 24 and the sleeve portion 23 having the forward and rear wall portions 27 and 26, all in a single operation of the die set. The sleeve portion 23 is formed around the pin 34 when the die block descends. As the die block 30 is released and raised to its initial position shown in FIGS. 5 and 7, the pin 34 is substantially simultaneously retracted to release the formed end of the tubular leg 21.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A metal tubular leg for a chair or the like having a normal or first outer diameter, said tubular leg formed at an end portion thereof to provide thereon integrally therewith a unitary socket having a second outer diameter reduced from said first outer diameter for a glide or a caster, the socket including a unitary sleeve portion having a longitudinal axis and an inner diameter reduced from said second outer diameter by the wall thickness of said tubular leg to receive the shank of a glide or the pintle of a caster, and further including a pair of opposite side rearwardly divergent substantially flat webs whose outer edges are parallel with the axis of said sleeve portion and the distance between said outer edges being only slightly greater than said normal diameter of the metal tubular leg, said webs having double parallel walls produced by folding of the metal of said tubular leg and said sleeve portion having opposing arcuate side walls each being joined integrally with one wall of each web, one of said opposing arcuate side walls positioned forwardly of said pair of rearwardly divergent webs, and said one of said opposing arcuate side walls having a portion in longitudinal alignment with and an extension of said first outer diameter of said tubular leg.

2. A metal tubular leg for a chair and the like as defined in claim 1, and the unitary sleeve portion including a forward deep arcuate side wall and an opposing rear shallow arcuate side wall, and the double parallel walls of said webs being substantially abutting.

3. A metal tubular leg for a chair or the like as defined in claim 2, in which said forward deep arcuate side wall is U-shaped in cross-section.

4. A metal tubular leg for a chair or the like as defined in claim 1, and an obtuse angle defined between the rear sides of said pair of rearwardly divergent substantially flat webs.

5. A metal tubular leg for a chair or the like as defined in claim 1, in which said metal tubular leg has a longitudinal axis, and the longitudinal axis of said unitary sleeve portion being offset from the longitudinal axis of said metal tubular leg.

6. A metal tubular leg for a chair or the like as defined in claim 1, and said outer edges of said webs offset rearwardly of said second outer diameter of said unitary socket.

7. A metal tubular leg for a chair or the like as defined in claim 1, and said outer edges of said webs offset to one side of said longitudinal axis of said unitary sleeve portion.

* * * * *